May 22, 1956  C. A. COBB  2,746,471
PRESSURE REGULATOR AND SHUT-OFF VALVE
Filed March 29, 1952
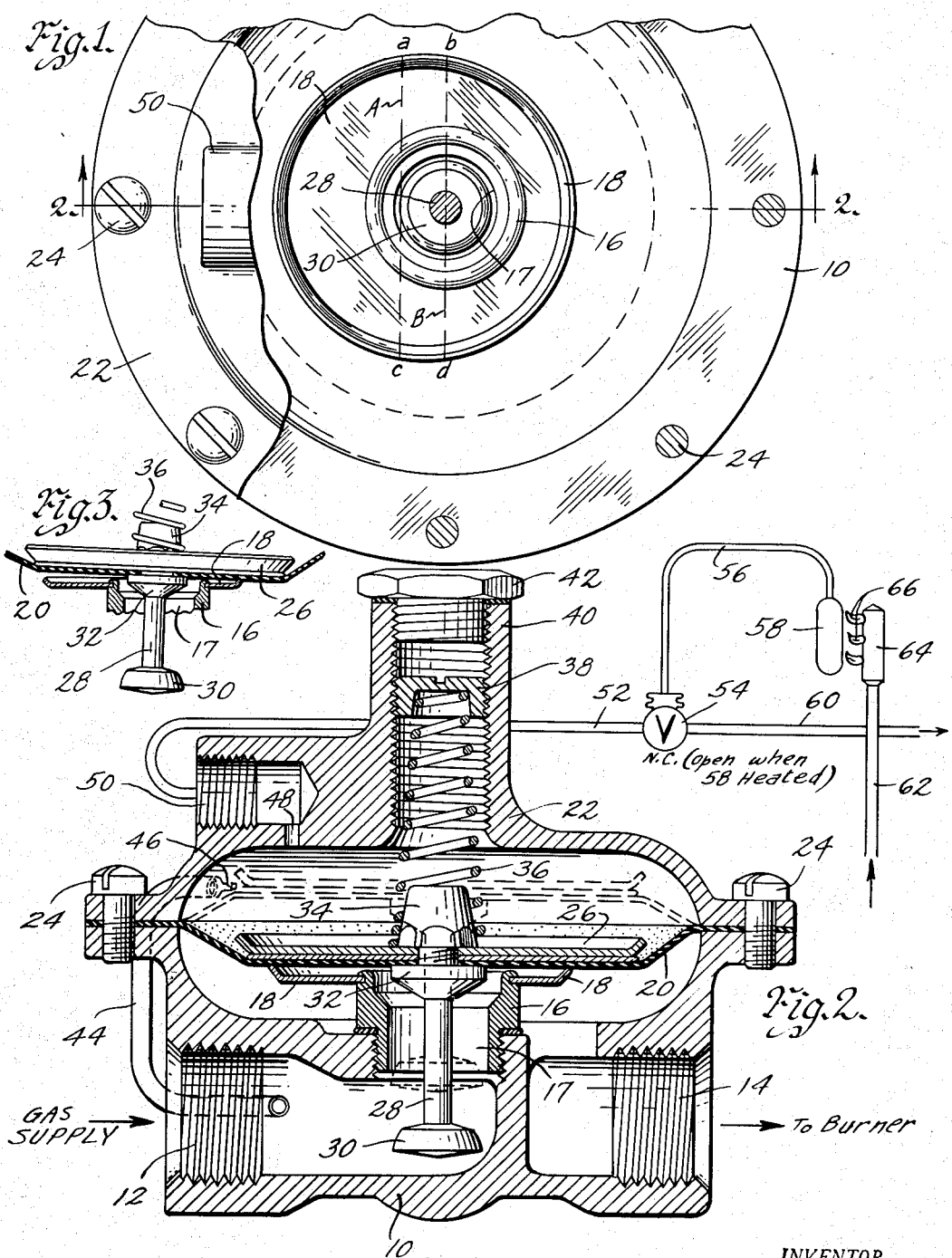
INVENTOR.
Clifton A. Cobb
BY
Bair, Freeman
& Molinare Attys.

United States Patent Office 2,746,471
Patented May 22, 1956

2,746,471

PRESSURE REGULATOR AND SHUT-OFF VALVE

Clifton A. Cobb, Goshen, Ind., assignor to Penn Controls, Inc., Goshen, Ind., a corporation of Indiana Application March 29, 1952, Serial No. 279,295

2 Claims. (Cl. 137—65)

This invention relates to a combined pressure regulator and shut-off valve, the valve structure disclosed being particularly designed for use in connection with a gas burner or the like.

One object of the invention is to provide a gas pressure regulator for supplying gas at a substantially constant pressure to the burner, and combined therewith a shut-off for the main gas line which operates upon pilot flame failure of a pilot that is provided for igniting the burner.

Another object is to provide a combined pressure regulator and shut-off valve utilizing a single diaphragm as distinguished from those types of prior art devices where a gas pressure regulator valve using one diaphragm and a shut-off valve responsive to the pilot flame using another diaphragm are arranged in series, either as separate valves or in the same valve body.

Still another object is to provide a valve structure so designed that a single diaphragm may effect operation of both the pressure regulating valve assembly and the shut-off valve assembly in a sequence which automatically opens the shut-off valve when a pilot flame is lit and has attained temperature and thereupon causes the valve to perform its pressure regulating function until such time as the pilot flame fails, whereupon the shut-off valve automatically recloses.

A further object is to provide an arrangement in which a pressure regulator valve assembly includes a diaphragm that has a predetermined area, and the shut-off valve includes the same diaphragm but a much greater area thereof to effect automatic operation of the valve, the greater area, however, being adequately controlled by the pressure fed to the valve by a novel arrangement wherein means biasing the shut-off valve to the closed position does so at a point off-center relative to the shut-off valve seat so that but a slight pressure is needed to tilt the shut-off valve against such bias, thereby "cracking" the shut-off valve open so that pressure fed to the valve structure thereupon operates to automatically open the valve to the regulating position.

Still a further object is to provide a valve structure for combined purposes of pressure regulating during normal burning operation and shut-off in case of pilot flame failure, which may be made relatively small (for instance an over-all diameter of about 4" for a burner to which one-half inch pipes supply gas), the valve having a suitably sized regulating valve mechanism and a somewhat larger area shut-off valve mechanism to accomplish the desired regulating and shut-off functions with the small pressures available in a gas line.

With these and other objects in view, my invention consists in the construction, arrangement and combination of the various parts of my pressure regulator and shut-off valve, whereby the objects contemplated are attained, as hereinafter more fully set forth, pointed out in my claims and illustrated in the accompanying drawings, wherein:

Figure 1 is an enlarged plan view of a valve structure of the combined gas pressure regulator and main gas shut-off type embodying my present invention, portions thereof being broken away and other portions being shown in section to illustrate internal details of construction.

Figure 2 is a vertical sectional view on the line 2—2 of Figure 1, and includes diagrammatically a temperature responsive pilot valve and a pilot light; and Figure 3 is a view of a portion of Figure 2 on a reduced scale and shows the tilting action of the valve during one part of its operating cycle.

On the accompanying drawing I have used the reference numeral 10 to indicate a valve body. The body 10 has an inlet 12 and an outlet 14. A sleeve 16 is mounted in the partition of the valve body between the inlet and the outlet and has a regulating passageway 17 (the bore of the sleeve 16).

Supported on the sleeve 16 is a shut-off valve seat 18 in the form of a disc connected therewith and having a turned-up peripheral edge constituting the seat. The seat 18 is off-center relative to the center of the sleeve 16 as indicated by the distance between the lines A and B in Figure 1, which lines are through the respective centers of the shut-off seat 18 and the sleeve 16.

A diaphragm 20 is provided and its peripheral edge is secured between the valve body 10 and a diaphragm cover 22 by means of screws 24 in a well-known manner. A diaphragm plate 26 is secured against the upper surface of the diaphragm 20 by means of a valve stem 28 having a collar 32 against the diaphragm, and a nut 34 threaded on the upper end of the stem to retain the diaphragm plate 26 against the upper surface of the diaphragm. The lower end of the stem 28 is provided with a regulating valve plug 30 for regulating cooperation with the passageway 17 as will hereinafter appear.

I provide a regulating spring 36 having its lower end surrounding the nut 34 and its upper end seated in a regulating spring adjusting plug 38 which is threaded in a hub 40 of the diaphragm cover 22. A closure plug 42 is provided for sealing the adjusting plug 38 within the valve body after adjustment is made.

A bypass pipe 44 is provided for bypassing the incoming gas pressure from the inlet 12 into the chamber within the diaphragm cover 22 above the diaphragm 20. This gas enters the chamber through a restriction 46.

The diaphragm cover 22 is provided with a bleed opening 48 leading into a boss 50 from which a bleed line 52 to a pilot valve 54 extends. The pilot valve is of the temperature responsive type having a capillary tube 56 extending to a temperature responsive bulb 58. The pilot valve 54 as indicated by the legend thereadjacent is normally closed (N. C.) and is open when the bulb 58 is heated.

A bleed line to the burner chamber is provided at 60 extending from the pilot valve 54. Also shown diagrammatically is a pilot burner gas line 62 leading from the gas supply or from the inlet 12 to a pilot burner 64 mounted adjacent the burner for igniting it whenever the gas is supplied thereto by my combined pressure regulator and shut-off valve. The flame of the pilot light is indicated at 66 and in addition to lighting the burner it heats the bulb 58 for the purpose of opening the pilot valve 54 as long as the pilot burner 64 continues to burn.

*Practical operation*

Assuming the shut-off portion of the valve structure being operated as shown in Figure 2 and the pilot burner 64 having just been lighted so as to produce the flame 66, this flame will heat the bulb 58 and shortly open the pilot valve 54. Thereupon gas pressure will be bled through 48, 52 and 60 into the burner chamber where it is ignited by the pilot flame 66 and thus the pressure above the diaphragm 20 is reduced with respect to the pressure therebelow within the confines of the shut-off seat 18, which pressures were equalized because of the bypass connection 44. The bleed-off of pressure through the valve 54 is in excess of the pressure that can enter through the restriction 46 so that the pressure in the diaphragm cover 22 above the diaphragm 20 can reach a value where the pressure under the diaphragm and within the confines of the seat 18 is sufficient to overcome the pressure above the diaphragm plus the pressure of the spring 36.

The pressure required for opening would be between 6" and 10" water column if it were not for the fact that the center of pressure of the spring 36 is off-center in relation to the center of pressure of the incoming gas against the lower part of the diaphragm, a distance as already mentioned equal to that between the lines A and B in Figure 1. This offset arrangement provides an area a, b, c, d in Figure 1 by which the left half of the effective area of the diaphragm is increased over that of the right half (the line B being its center line between the two halves) which results in tilting of the valve as in Figure 3 with the application of only about 2" water column pressure. Once this occurs, the whole under area of the diaphragm 20 is subjected to the inlet gas pressure through the wide-open regulator valve 17—30 to effect quick opening of the shut-off valve and a quick movement of the valve plug 30 as to the dotted position shown in Figure 2 which is the regulating position thereof as determined by the demands of the burner on the outlet 14 balanced against the incoming pressure at 12 and the setting of the spring 36. Thereafter the valve plug 30 will remain in the regulating zone and modulate the gas flow to maintain a substantially equal pressure at the gas burner due to the outlet pressure acting on the under side of the diaphragm 20 in the usual manner of standard regulating valves.

The shut-off valve operation is similar to a simple gas diaphragm valve in that pressure is applied or relieved with respect to the area above the diaphragm. However, it is the type of valve which opens from gas pressure on the under surface of the diaphragm within the confines of the shut-off seal 18 and therefore permits of actuation by a constant bleed pilot valve system such as shown. Equal gas pressure is applied within the confines of the seat 18, and through the bypass 44 and the restriction 46 to the space above the diaphragm 20 so that the valve is normally closed under the action of the spring 36 and the predominating pressure above the diaphragm 20 with respect to that within the confines of the seat 18. Consequently no gas flows because of 20 seating against 18.

By relieving the gas pressure from above the diaphragm through the bleed opening 48, the diaphragm will react to the reduction in pressure and the pressure below the diaphragm will raise it off the seat 18, the initial tilting of the diaphragm as shown in Figure 3 permitting the escape of gas to the under side of the entire diaphragm which has the ability to do so because of its large diameter and the seat being mounted off-center minimizing the pressure required for this operation. Once the diaphragm is cracked off the seat 18, the diaphragm will continue to rise until the action of regulation takes place and stabilizes the output gas pressure at 14.

The load spring 36 being centered on the diaphragm and the shut-off seat 18 being off-center, an advantage of tilting action of the valve off the seat is attained so that a small amount of gas will bleed through to the diaphragm and begin the sequences necessary to bring the unit into activity as a regulator.

Subsequently, upon failure of the pilot flame 66, gas pressure is again applied to the upper surface of the diaphragm 20 because of closure of the pilot valve 54 and this pressure neutralizes that below the diaphragm so that the regulator spring 36 forces the diaphragm 20 against the shut-off seat 18 and the flow of gas to the burner is thereby stopped until such time as the pilot light 64 is reignited and the system thereby put back into operation.

Some changes may be made in the construction and arrangement of the parts of my pressure regulator and shut-off valve without departing from the real spirit and purpose of my invention, and it is my intention to cover by my claims any modified forms of structure or use of mechanical equivalents which may be reasonably included within their scope.

I claim as my invention:

1. A combined pressure regulator and shut-off valve comprising a valve body having an inlet, an outlet and a regulating passageway, a regulating seat at one end of said regulating passageway, a regulating valve plug adapted to coact therewith to effect a regulating action, a shut-off seat at the other end of said regulating passageway and of greater area than said regulating seat, said shut-off seat being displaced from the axis of said regulating passageway and regulating seat, a diaphragm for actuating said regulating valve plug and for seating on said shut-off seat, means aligned with said axis and biasing said diaphragm toward seated position, a first portion of one side of said diaphragm spanning said shut-off seat being subject to the pressure in said inlet and the remaining area of said side of said diaphragm being subject to the pressure in said outlet, means to normally subject the opposite side of said diaphragm to pressure from said inlet, means to relieve such pressure to unseat said diaphragm from said shut-off seat, said displacement of said shut-off seat from the axis of said regulating passageway and said regulating seat effecting a tilting action of said diaphragm off said shut-off seat due to the pressure of said inlet against said first portion of said diaphragm when greater than the pressure above the diaphragm plus the load of said biasing means.

2. In a combined pressure regulator and shut-off valve, a valve body having an inlet, an outlet and a regulating passageway, a regulating seat at one end of said regulating passageway, a regulating valve plug adapted to coact with said regulating seat to effect a regulating action, a shut-off seat located at the other end of said regulating passageway and being of greater area than said regulating seat, said shut-off seat being displaced from the axis of said regulating passageway and said regulating seat, a diaphragm for actuating said regulating valve plug and for seating on said shut-off seat, means aligned with said axis and biasing said diaphragm toward seated position, a first portion of one side of said diaphragm spanning said shut-off seat being subject to the pressure in said inlet and the remaining area of said side of said diaphragm being subject to the pressure in said outlet, means to normally subject the opposite side of said diaphragm to pressure from said inlet, means to relieve such pressure to unseat said diaphragm from said shut-off seat, said displacement of said shut-off seat from the axis of said regulating passageway and said regulating seat effecting a tilting action of said diaphragm off said shut-off seat to thereby permit relatively quick entry of pressure from said inlet under the entire area thereof once the tilting action begins for quickly moving said regulating valve plug to regulating position.

References Cited in the file of this patent

UNITED STATES PATENTS

| | | |
|---|---|---|
| 1,852,033 | Summers | Apr. 5, 1932 |
| 1,853,196 | Bogle | Apr. 12, 1932 |
| 2,111,560 | Fox | Mar. 22, 1938 |
| 2,291,567 | Wunsch | July 28, 1942 |
| 2,333,775 | Gille | Nov. 9, 1943 |
| 2,558,651 | Ives | June 26, 1951 |